US012811469B2

(12) United States Patent
Crosson

(10) Patent No.: US 12,811,469 B2
(45) Date of Patent: Nov. 24, 2026

(54) AIR-COOLED MOTOR ASSEMBLY WITH SHROUD

(71) Applicant: Regal Beloit America, Inc., Milwaukee, WI (US)

(72) Inventor: Jeffrey William Crosson, Los Angeles, CA (US)

(73) Assignee: Regal Beloit America, Inc., Milwaukee, WI (US)

( * ) Notice: Subject to any disclaimer, the term of this patent is extended or adjusted under 35 U.S.C. 154(b) by 217 days.

(21) Appl. No.: 18/676,011

(22) Filed: May 28, 2024

(65) Prior Publication Data

US 2025/0373118 A1 Dec. 4, 2025

(51) Int. Cl.

| | |
|---|---|
| ***H02K 9/06*** | (2006.01) |
| ***F04D 29/58*** | (2006.01) |
| ***H02K 9/08*** | (2006.01) |
| ***H02K 9/22*** | (2006.01) |

(52) U.S. Cl.

CPC ................ *H02K 9/06* (2013.01); *H02K 9/08* (2013.01); *H02K 9/227* (2021.01)

(58) Field of Classification Search

CPC . H02K 9/06; H02K 9/08; H02K 9/227; F04D 13/0686; F04D 29/5806; F04D 29/5813; F04D 29/58; F04D 19/002; F04D 29/526

USPC .......................................................... 310/64

See application file for complete search history.

(56) References Cited

U.S. PATENT DOCUMENTS

| | | | | |
|---|---|---|---|---|
| 2,494,200 | A * | 1/1950 | Ramqvist | H02K 9/06 310/52 |
| 2,778,958 | A * | 1/1957 | Hamm | H02K 9/14 310/63 |
| 6,431,839 | B2 | 8/2002 | Gruber et al. | |
| 7,042,121 | B2 | 5/2006 | De Filippis et al. | |
| 7,362,017 | B2 * | 4/2008 | Piper | H02K 11/33 310/68 R |
| 7,541,701 | B2 | 6/2009 | Lin et al. | |
| 9,812,920 | B2 * | 11/2017 | McKinzie | H02K 9/227 |
| 11,264,860 | B2 * | 3/2022 | Zhu | H02K 5/207 |
| 11,996,732 | B2 * | 5/2024 | Jang | H02K 1/20 |
| 12,489,341 | B2 * | 12/2025 | Büttner | F04D 29/5806 |
| 2021/0277915 | A1 | 9/2021 | Miller et al. | |

* cited by examiner

*Primary Examiner* — Burton S Mullins
(74) *Attorney, Agent, or Firm* — Armstrong Teasdale LLP

(57) ABSTRACT

A motor assembly is provided that includes a mounting bracket and a housing defining a first compartment. The motor assembly further includes a motor positioned within the first compartment and a shroud coupled to the housing. The shroud includes a body which includes a base and a first sidewall extending around the periphery of the base, the base and the first sidewall define a second compartment. The motor assembly further includes a shaft coupled to the motor and configured to rotate about an axis, the shaft extends axially through an opening in the shroud into the second compartment. The motor assembly also includes a heatsink coupled to the shroud relative to the second compartment, the heatsink configured to introduce airflow into the second compartment. The motor assembly further includes a fan positioned between the second compartment of the shroud and the heatsink and configured to draw airflow from the heatsink.

20 Claims, 10 Drawing Sheets

AIR-COOLED MOTOR ASSEMBLY WITH SHROUD

BACKGROUND

The field of the disclosure relates generally to a motor assembly and, more particularly, to an air-cooled motor assembly including a shroud.

At least some known electric motor assemblies include various components that generate heat during operation and include fans for cooling those components. However, directing airflow to a desired location relative to the electric motor assembly, with sufficient volume, can be challenging. Typical electric motor assemblies use components to assist in directing the airflow to the desired location. However, additional components require the assembly to be larger and have a higher cost. Therefore, a need exists for a simplified electric motor assembly to accomplish directing airflow to the desired location.

This background section is intended to introduce the reader to various aspects of art that may be related to various aspects of the present disclosure, which are described and/or claimed below. This discussion is believed to be helpful in providing the reader with supporting information to facilitate a better understanding of the various aspects of the present disclosure. Accordingly, it should be understood that these statements are to be read in this light, and not as admissions of prior art.

BRIEF DESCRIPTION

In one aspect, a motor assembly is provided that includes a mounting bracket and a housing, the mounting bracket coupled to the housing, the housing defining a first compartment. The motor assembly further includes a motor positioned within the first compartment. The motor assembly also includes a shroud coupled to the housing. The shroud includes a body which includes a base and a first sidewall extending around the periphery of the base, the base and the first sidewall define a second compartment, wherein the shroud defines a plurality of circumferentially spaced passages, the plurality of circumferentially spaced passages are in fluid communication with the second compartment. The motor assembly further includes a shaft coupled to the motor and configured to rotate about an axis, the shaft extends axially through an opening in the shroud into the second compartment. The motor assembly also includes a heatsink coupled to the shroud relative to the second compartment, and a cover coupled to the heatsink, the heatsink configured to introduce airflow into the second compartment. The motor assembly further includes a fan coupled to the shaft and positioned between the second compartment of the shroud and the heatsink, the fan configured to draw airflow from the heatsink.

In another aspect, a motor assembly is provided that includes a mounting bracket and a housing, the mounting bracket coupled to the housing, the housing defining a first compartment, and a motor positioned within the first compartment. The motor assembly includes a shroud coupled to the housing. The shroud includes a body which includes a base, a first sidewall extending around the periphery of the base, and a second sidewall that is spaced a distance from the first sidewall around the periphery of the base and in a direction away from the base. The base and the first sidewall define a second compartment, wherein the base and the first sidewall define a first set of circumferentially spaced passages, and the first sidewall and the second sidewall define a second set of circumferentially spaced passages. The first set of passages are in fluid communication with the second compartment and the second set of passages. The motor assembly further includes a shaft coupled to the motor and configured to rotate about an axis, the shaft extends axially through an opening in the shroud into the second compartment. The motor assembly also includes a heatsink coupled to the shroud relative to the second compartment, and a cover coupled to the heatsink, the heatsink configured to introduce airflow into the second compartment. The motor assembly further includes a fan coupled to the shaft and positioned between the second compartment of the shroud and the heatsink, the fan configured to draw airflow from the heatsink.

In yet another aspect, a method of operating a motor assembly is provided. The motor assembly includes a mounting bracket and a housing, the mounting bracket coupled to the housing, The housing defining a first compartment. The motor assembly also includes a motor positioned within the first compartment and a shroud coupled to the housing, the shroud includes a body, which includes a base and a first sidewall extending around the periphery of the base, the base and the first sidewall define a second compartment. The shroud defines a plurality of circumferentially spaced passages that are in fluid communication with the second compartment. The motor assembly also includes a shaft coupled to the motor and configured to rotate about an axis, the shaft extends axially through an opening in the shroud into the second compartment. The motor assembly further includes a heatsink coupled to the shroud relative to the second compartment, and a cover coupled to the heatsink, the heatsink configured to introduce airflow into the second compartment. The motor assembly also includes a fan coupled to the shaft and positioned between the second compartment of the shroud and the heatsink, the fan configured to draw airflow from the heatsink. The method includes drawing airflow from outside the motor assembly through the heatsink, introducing the airflow into the second compartment of the shroud through an opening in the fan, circulating the airflow within the second compartment of the shroud, and directing the airflow through the plurality of passages and in the direction of the housing.

As used herein, "a", "an", and "the" refer to both singular and plural referents unless the context clearly dictates otherwise.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform in the one or more embodiments of the disclosure described herein. Furthermore, it is also to be understood that the value to which the modifier "about" refers is itself specifically disclosed herein.

As used herein, spatially relative terms, such as "beneath", "below", "lower", "above", "upper", "front", "back", "side", "left", "right", "rear", "top", "bottom", and the like, are used for ease of description to describe one element or feature's relationship to another element(s) or feature(s). It is further understood that the terms "front", "back", "left", and "right" are not intended to be limiting and are intended to be interchangeable, where appropriate. Further, it should be noted that the terms "first," "second," and the like herein do not denote any order, quantity, or relative importance, but rather are used to distinguish one element from another.

As used herein, the terms "comprise(s)", "comprising", and the like, specify the presence of stated features, integers, steps, operations, elements, and/or components, but do not preclude the presence or addition of one or more other features, integers, steps, operations, elements, components, and/or groups thereof.

As used herein, the terms "configure(s)", "configuring", and the like, refer to the capability of a component and/or assembly, but do not preclude the presence or addition of other capabilities, features, components, elements, operations, and any combinations thereof.

All ranges disclosed herein are inclusive of the endpoints, and the endpoints are independently combinable with each other. Each range disclosed herein constitutes a disclosure of any point or sub-range lying within the disclosed range.

All methods described herein can be performed in any suitable order unless otherwise indicated herein or otherwise clearly contradicted by context. The use of any and all examples, or exemplary language (e.g., "such as"), is intended merely to better illustrate the embodiments of the disclosure and does not pose a limitation on the scope of the disclosure or any embodiments unless otherwise claimed.

Any combination or permutation of features, functions, and/or embodiments as disclosed herein is envisioned. Additional advantageous features, functions, and applications of the disclosed systems, methods, and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale. Corresponding reference characters indicate corresponding parts throughout the several views of the drawings.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure.

Figure 1:
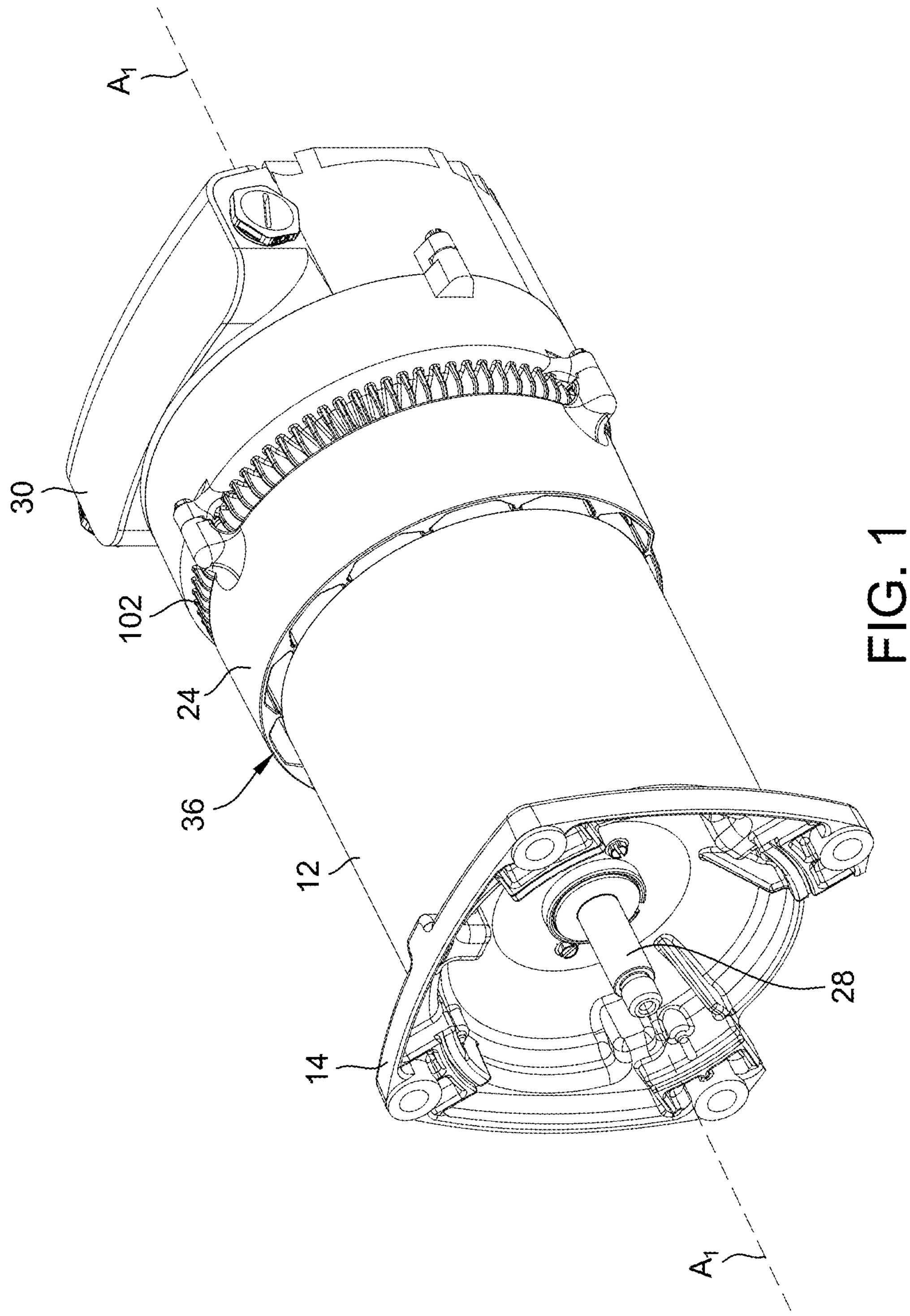
Figure 2:
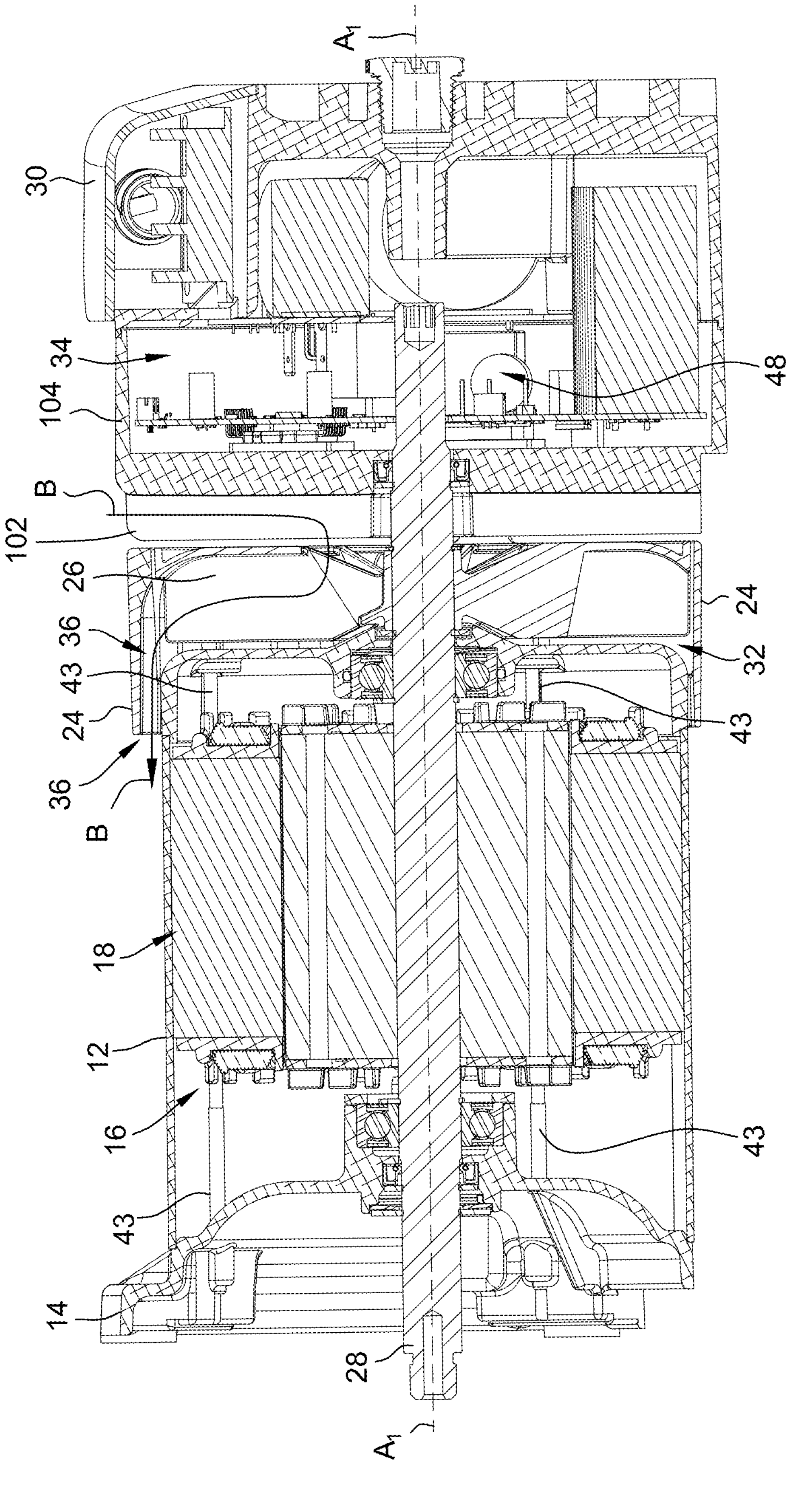
Figure 3:
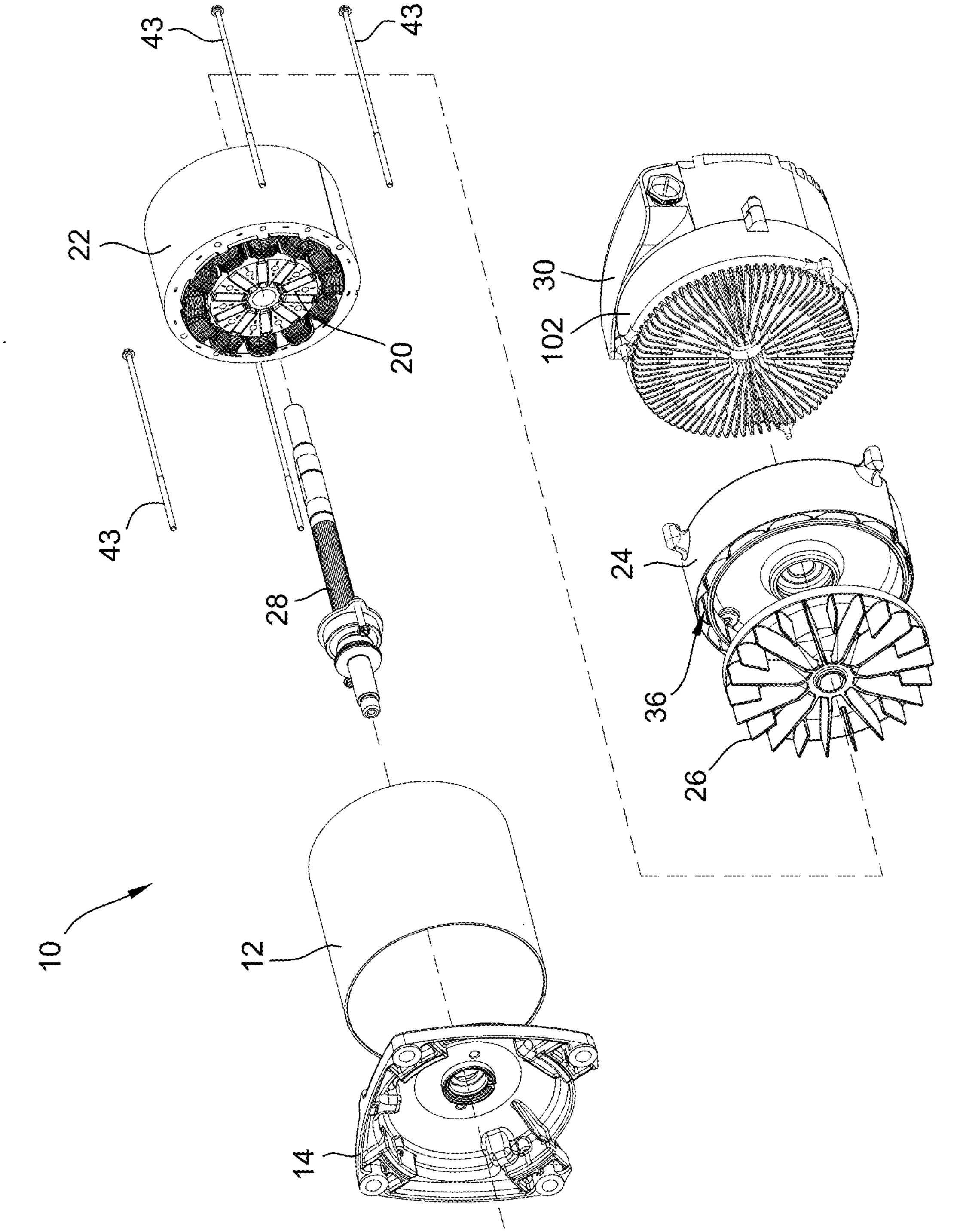
Figure 4A:
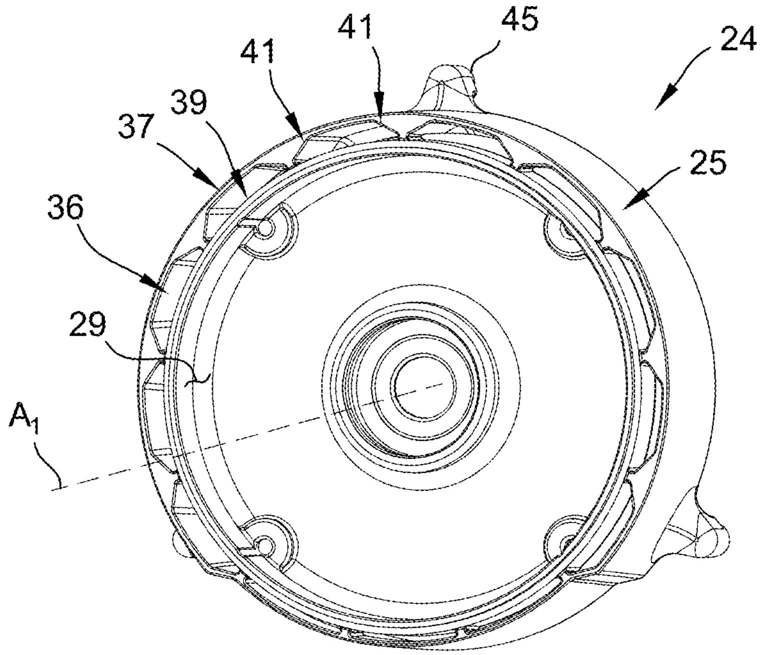
Figure 4B:
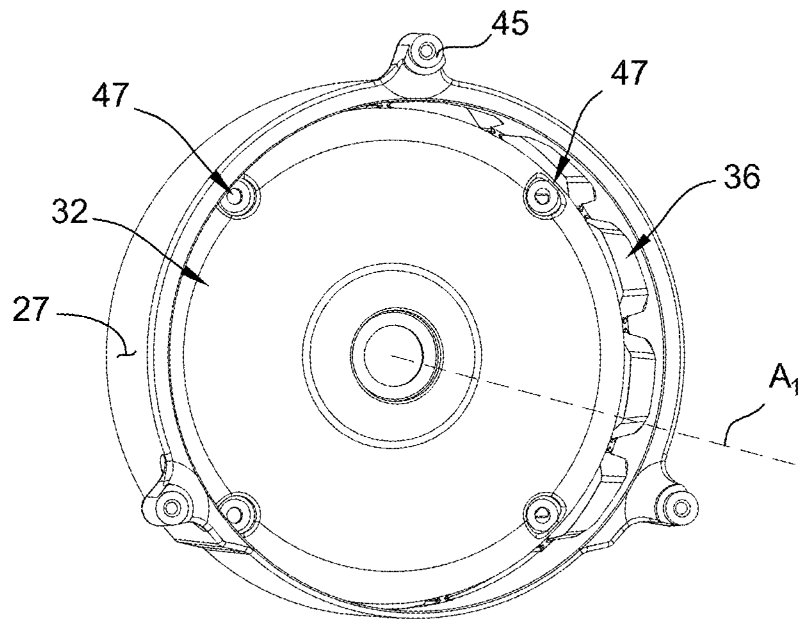
Figure 5:
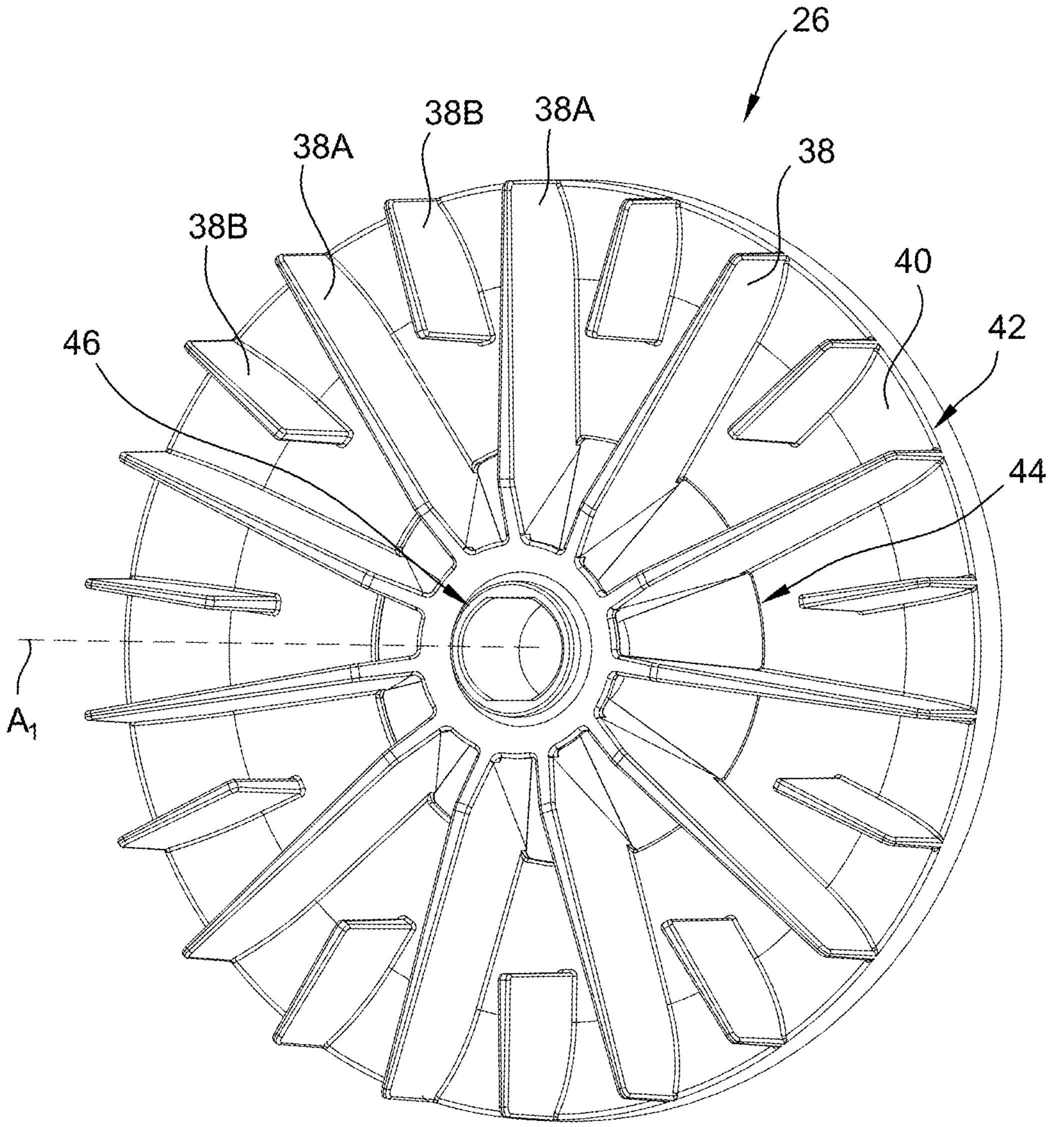
Figure 6:
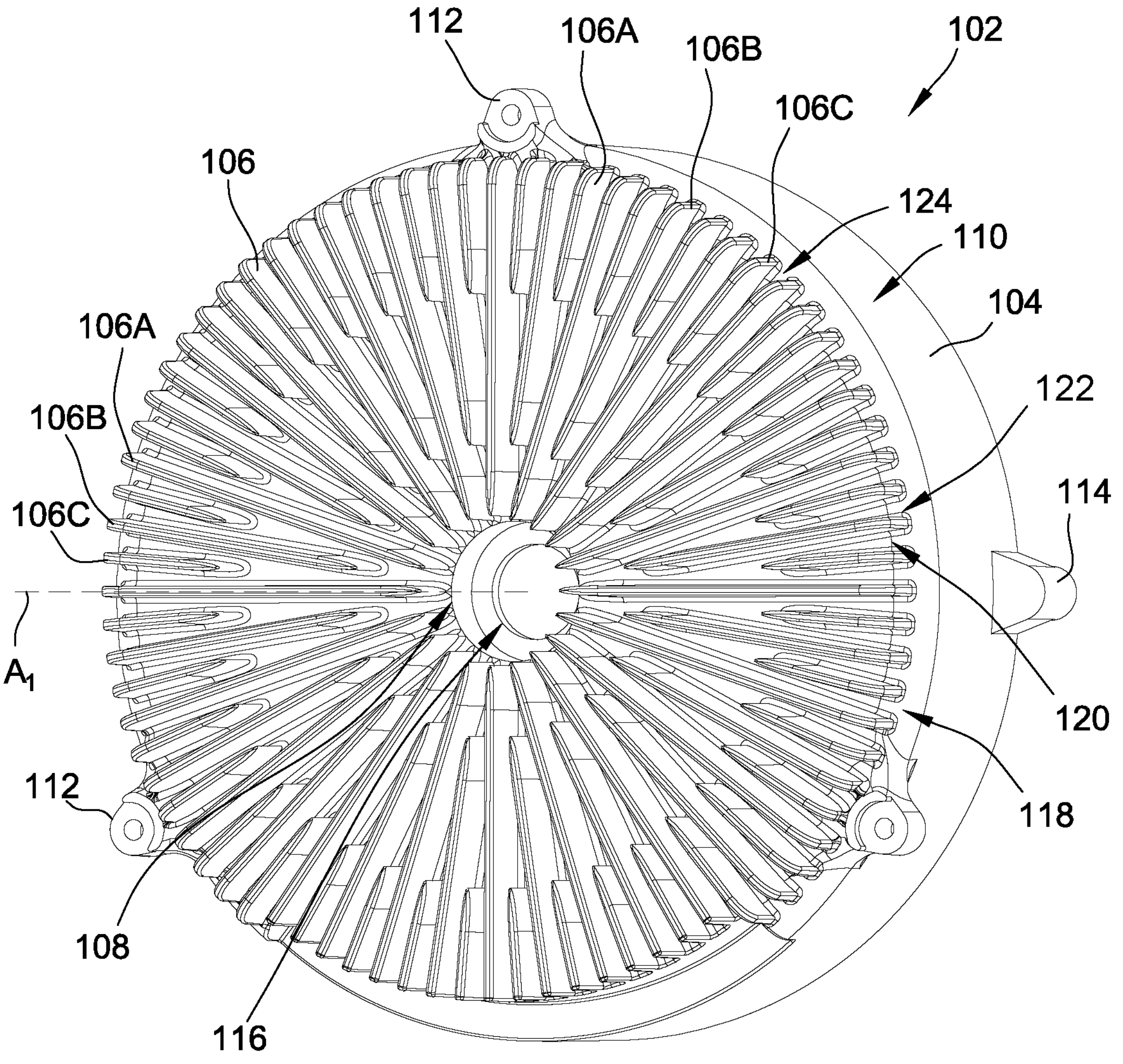
Figure 7:
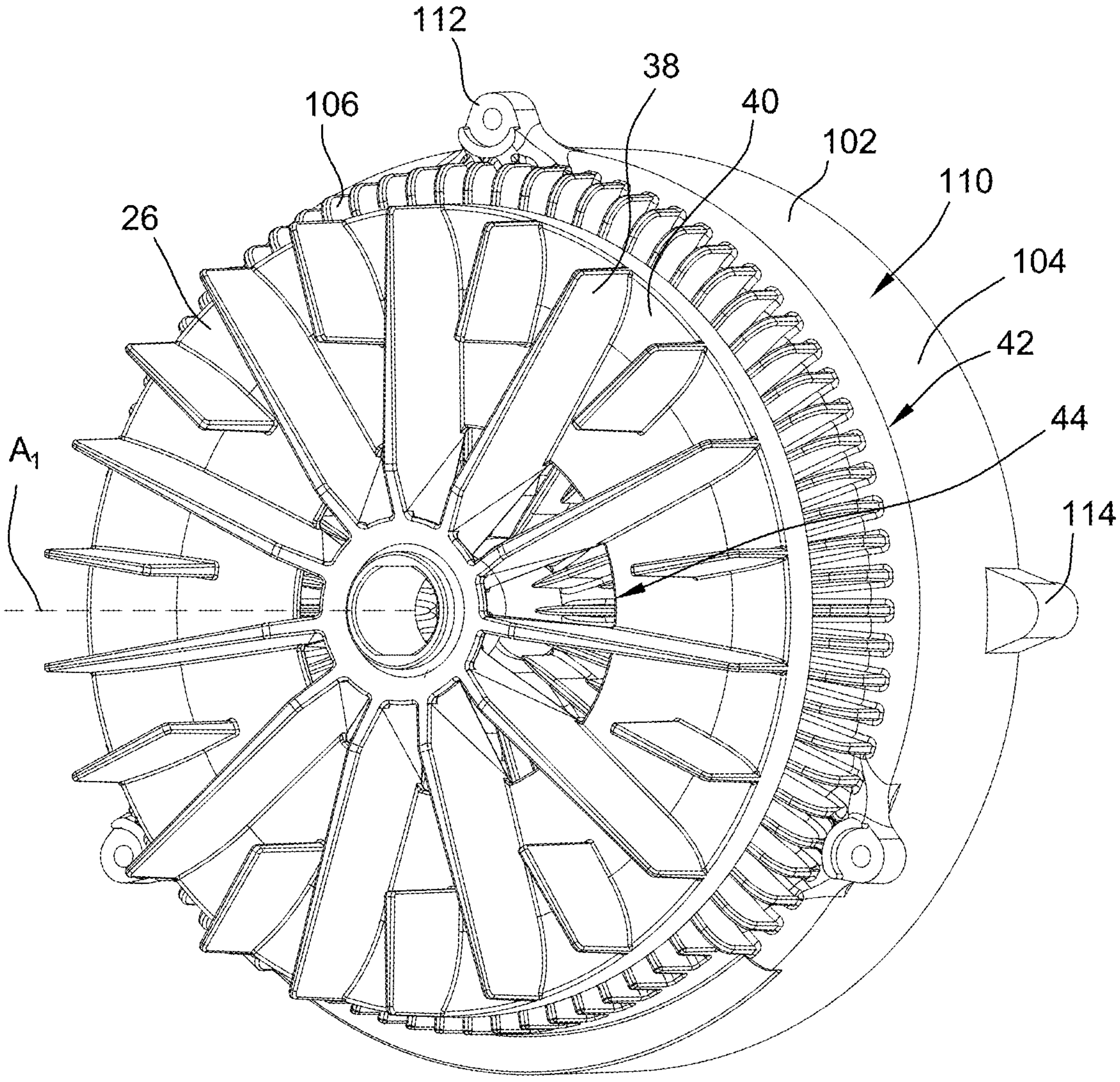
Figure 8:
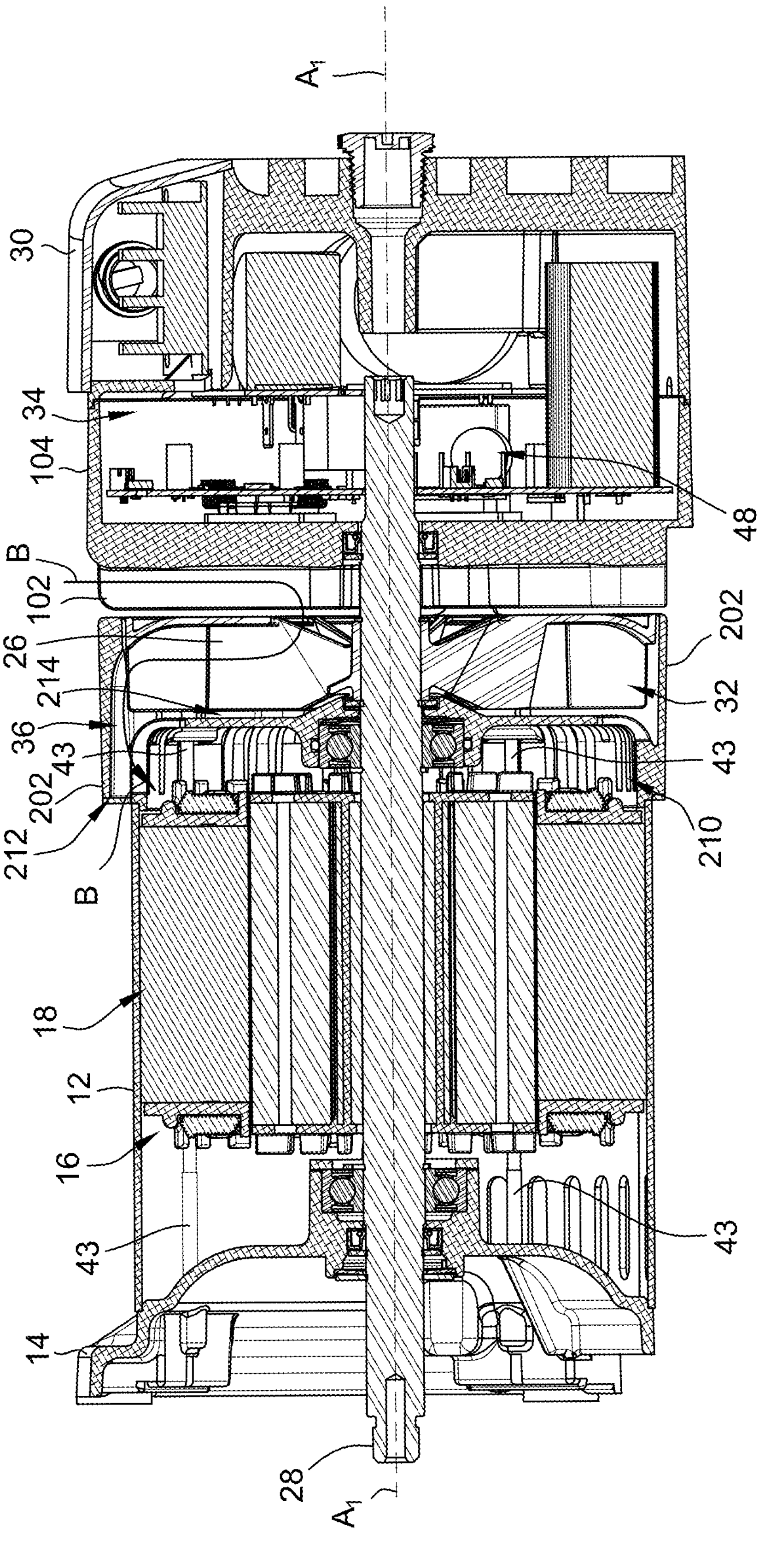
Figure 9:
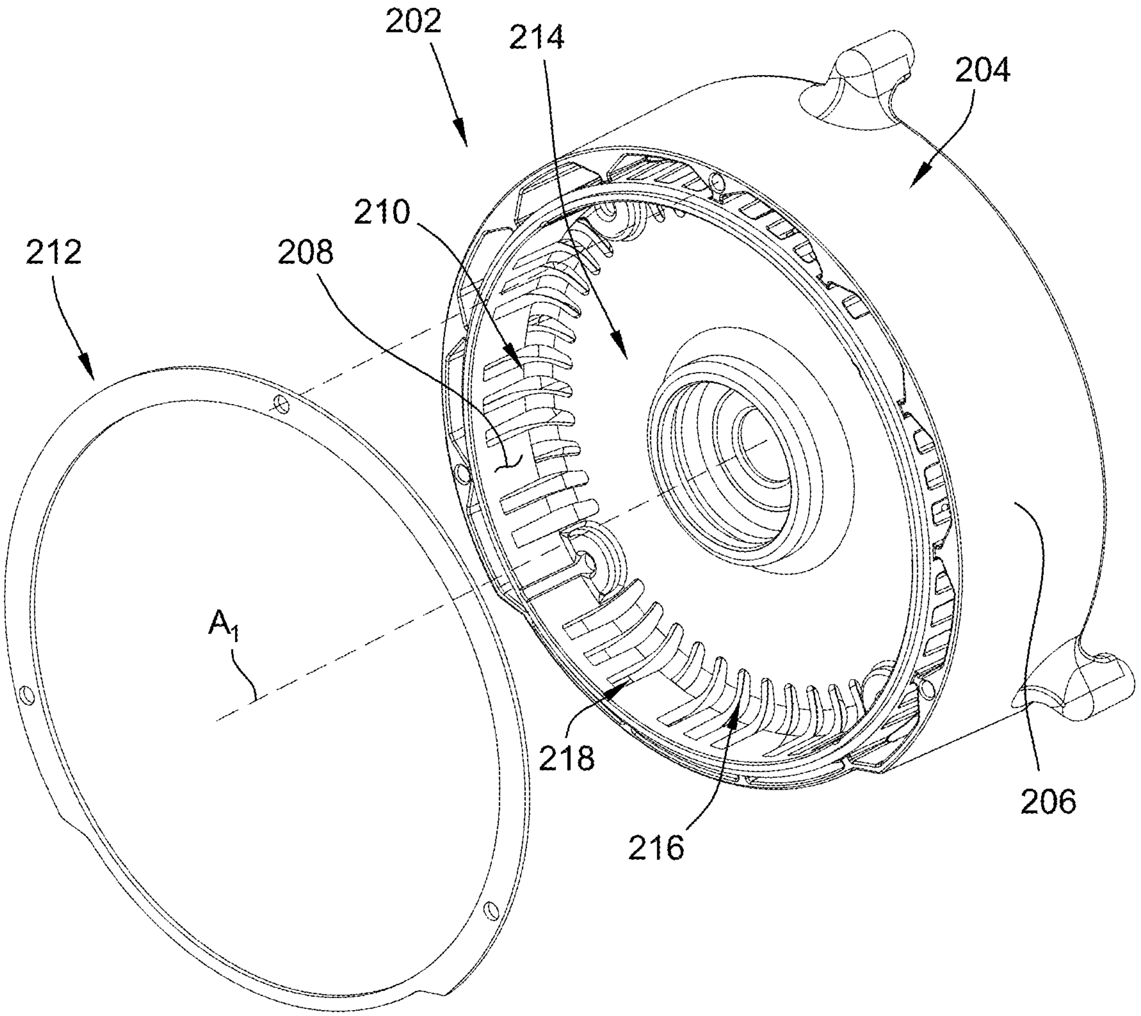
Figure 10A:
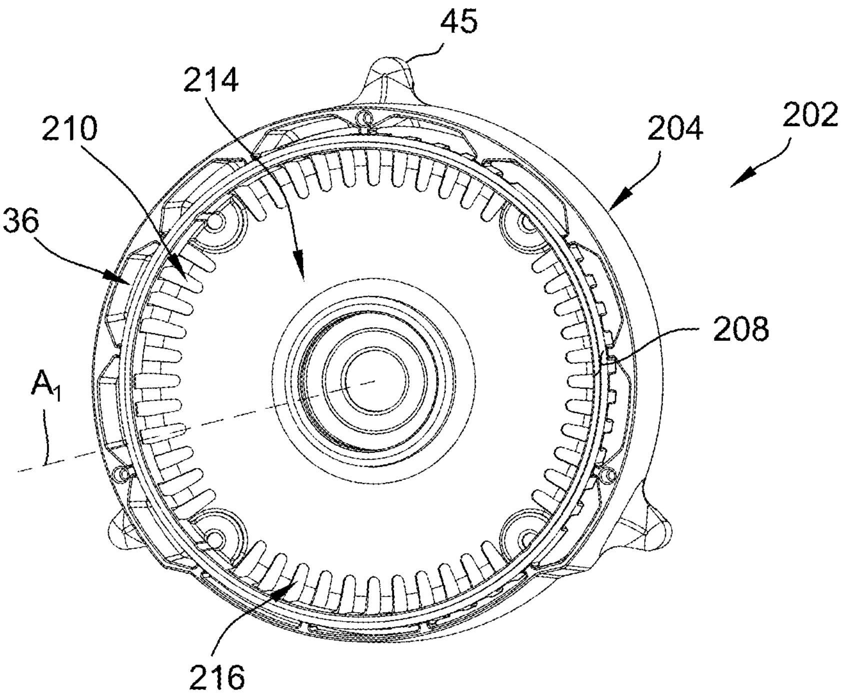
Figure 10B:
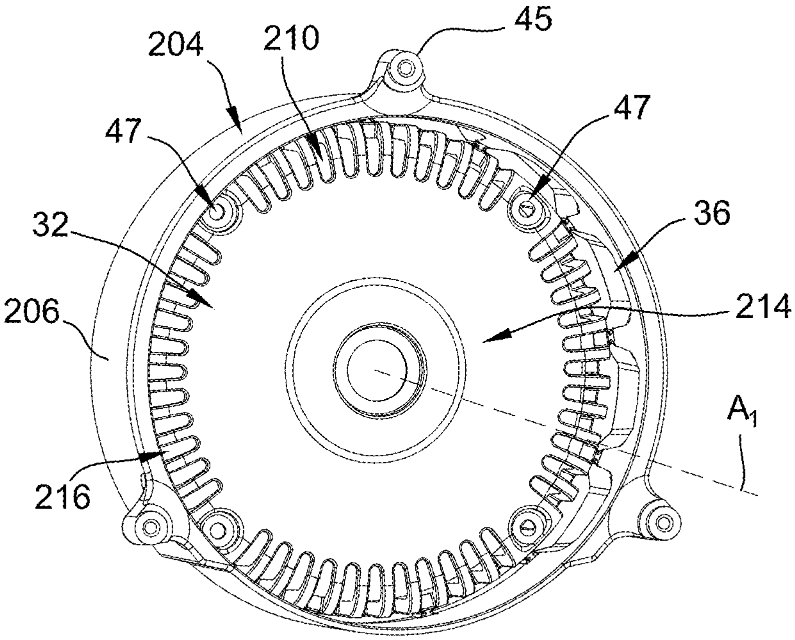

To assist those of ordinary skill in the art in making and using the disclosed assemblies and systems, reference is made to the appended figures, wherein:

FIG. 1 is a perspective view of an exemplary motor assembly;

FIG. 2 is a cross-sectional view of the motor assembly shown in FIG. 1;

FIG. 3 is a partially exploded view of the motor assembly shown in FIG. 1;

FIG. 4A is a bottom perspective view of a shroud that may be used with the motor assembly of FIG. 1;

FIG. 4B is a top perspective view of the shroud shown in FIG. 4A;

FIG. 5 is a perspective view of a fan that may be used with the motor assembly of FIG. 1;

FIG. 6 is a perspective view of a heatsink that may be used with the motor assembly of FIG. 1;

FIG. 7 is a perspective view of an assembly including the fan, as shown in FIG. 5, and the heatsink, as shown in FIG. 6;

FIG. 8 is a cross-sectional view of the motor assembly shown in FIG. 1 with an alternative shroud that may be used therewith;

FIG. 9 is a perspective view of the shroud shown in FIG. 8;

FIG. 10A is a bottom perspective view of the shroud shown in FIG. 8; and FIG. 10B is a top perspective view of the shroud shown in FIG. 10A.

DETAILED DESCRIPTION

FIG. 1 is a perspective view of an exemplary motor assembly 10 and FIG. 2 is a cross-sectional view of the motor assembly 10 depicted in FIG. 1. FIG. 3 is a partial exploded view of the motor assembly 10 of FIG. 1. In an exemplary embodiment, the motor assembly 10 includes a housing 12 coupled to a mounting bracket 14. At least the housing 12 and the mounting bracket 14 combine to define a cavity. The housing cavity is referred to as the first compartment 16. The first compartment 16 is sized and shaped to receive at least a portion of a motor 18. The motor 18 includes a rotor 20 and a stator 22 circumscribing the rotor 20.

A shroud 24 is positioned in proximity to the motor 18 and coupled to the housing 12. The shroud 24 is attached to at least one of the housing 12 and/or the mounting bracket 14. For example, the shroud 24 is attached to the mounting bracket 14 by way of fasteners 43 through fastener openings 47 of the shroud 24. However, it should be understood that alternative forms of attachment may be used without departing from the spirit/scope of this disclosure. At least the shroud 24 defines a cavity. The shroud cavity is referred to as the second compartment 32. The shroud 24 is discussed in more detail with reference to FIGS. 4A and 4B.

A fan 26 is positioned at least partially within the second compartment 32 of the shroud 24 (FIG. 2). The fan is rotatably coupled to the motor 18. A shaft 28 of the motor 18 extends axially through axially aligned openings provided in the mounting bracket 14, the rotor 20, the stator 22, and is coupled to at least the fan 26 at shaft opening 46. The motor assembly 10 defines an axis $A_1$ that extends the entirety of the assembly 10 through the aligned openings in the mounting bracket 14, the rotor 20, the stator 22, and the fan 26. The shaft 28 is aligned with the axis $A_1$. The fan 26 is configured to rotate about axis $A_1$ in its location between the shroud 24 and the heatsink 102. The fan 26 is configured to generate a cooling airflow that is channeled by the shroud 24 along an exterior of the housing 12. The fan 26 is discussed in more detail with reference to FIG. 5.

A heatsink 102 is coupled to the shroud 24 and a cover 30, the cover 30 is positioned at an end of the motor assembly 10 that is opposite from the location of the mounting bracket 14. The heatsink 102 may be removably coupled to the shroud 24 and/or the cover 30. At least the heatsink 102 defines a cavity. The heatsink cavity is referred to as the third compartment 34. The heatsink 102 is discussed in more detail below with reference to FIGS. 6 and 7. The axis $A_1$ extends between the mounting bracket 14 and the cover 30 (FIG. 2). The mounting bracket 14, the motor 18, the shroud 24, the fan 26, the heatsink 102 and the cover 30 are located along axis $A_1$. The centers of openings provided in the fan 26, heatsink 102, motor 18, shroud 24, cover 30, and mounting bracket 14 are aligned along the axis $A_1$.

Referring further to FIGS. 4A and 4B, the shroud 24 includes a body 25 that defines an outer sidewall 27 and an inner sidewall 29. The inner sidewall 29 is spaced from the outer sidewall by a distance that extends radially inwardly in the direction of the axis $A_1$. The body 25 includes a plurality of openings 36 that are circumferentially spaced around the shroud 24 relative to the axis $A_1$. In the present disclosure the openings 36 are spaced circumferentially along a portion of the shroud 24. The plurality of openings 36 may be circumferentially spaced around the entirety of the shroud 24. In other instances, the plurality of openings 36 may be circumferentially spaced around a portion of the shroud 24. The plurality of openings 36 channel the air from at least within the second compartment 32 to outside the shroud 24 and along the exterior of the housing 12, as indicated by the arrow B (FIG. 2). The plurality of openings 36 are evenly spaced around at least a portion of the periphery of the shroud 24. In some instances, the plurality of openings 36 may be unevenly spaced around at least a portion of the periphery of the shroud 24.

The openings 36 may be trapezoidally shaped so as to define a first side 37 of the opening 36 that has a circumferentially extending length that is less than the circumferential length of a second side 39, radially opposed to the first side 37. The first side 37 is in proximity to the outer sidewall 27 of the body 25 and the second side 39 is in proximity to the inner sidewall 29 of the body 25. Similarly, the plurality of openings 36 may resemble a scalloped design such that the first side 37 and/or the second side 39 defined a radiused profile. The openings 36 may define a pair of opposing angled features 41 that extend between the first side 37 and the second side 39, consistent with the generally trapezoidal configuration of the openings. The angled features 41 diverge as they extend radially from the first side 37. Each opening 36 is defined by a first side 37, a second side 39 and a pair of angled features 41 extending between the first and second sides. The angled features 41 are situated at least partially within the airflow path of the fan 26. The angled features 41 may improve the airflow directed from the fan 26 through the openings 36. The angled features 41 may reduce the noise of the airflow being directed from the fan 26 through the openings 36. In other instances, the openings 36 may define a variety of shapes, for example, a circle, triangle, quadrilateral, trapezoid, oval, and combinations thereof.

Referring further to FIG. 5, the fan 26 includes a plurality of fins 38 which are circumferentially oriented around the axis $A_1$. The plurality of fins 38 extend from a fan shroud 40 in a direction away from the heatsink 102 (FIGS. 2 and 3). The plurality of fins 38 may include a first fin 38A and a second fin 38B. It should be understood that the first and second fins 38A, 28B may be collectively referred to as reference number 38 and distinguishing between the two fins 38 enables a more thorough explanation of the fan 26. It does not, however, inherently indicate differences between the two fins 38, unless otherwise expressly stated. The first fins 38A may be spaced a distance from each other and the second fins 38B may be positioned therebetween. The fan shroud 40 includes an outer edge 42 and an inner opening 44 that is concentric with the outer edge 42 and is located along the axis $A_1$ when used in the motor assembly 10. The outer edge 42 may define a wall that is directed outwardly and away from the fan shroud 40 and in the direction of the fins 38. The shaft opening 46 has a center that is longitudinally aligned with the concentric centers of the fan shroud 40 and the opening 44 of the fan 26. As shown in FIG. 5, fins 38A extend radially between the outer edge 42 and shaft opening 46 and fins 38B extend radially from the outer edge 42 a portion of the radial distance between the outer edge 42 and the shaft opening. As shown in FIG. 5, of the present disclosure, the fins 38B extend radially inwardly from outer edge 42 a distance that is about a third of the total distance between outer edge and the shaft opening 46. It should be understood that the fins 38B may have any suitable length. The fin 38B is located between each pair of adjacent fins 38A.

Referring further to FIG. 6, the heatsink 102 includes a heatsink body 104 and a plurality of protrusions 106 that extend therefrom. The plurality of protrusions 106 extend from the heatsink body 104. When assembled for use in the motor assembly 10, the protrusions 106 extend from the heatsink body 104 in the direction of the fan 26 (FIGS. 2, 3, and 7). The plurality of protrusions 106 extend radially between an opening 108 and an outer edge 110 of the heatsink body 104. The outer edge 110 is concentric with the opening 108 and the opening 108 is aligned with the axis $A_1$. The plurality of protrusions 106 may be any shape that enables airflow to travel from the outer edge 110 towards the opening 108. The plurality of protrusions 106 may be shaped as a fin, a pin, and variations thereof. The plurality of protrusions 106 may be angled relative to each other, parallel (or nearly parallel) relative to each other, and combinations thereof.

The plurality of protrusions 106 may include a first protrusion 106A and a second protrusion 106B. It should be understood that the first, second, and third protrusions 106A, 106B, 106C may be collectively referred to as reference number 106 and distinguishing between the three protrusions 106 enables a more thorough explanation of the heatsink 102. It does not, however, inherently indicate differences between the three protrusions 106, unless otherwise expressly stated. The first protrusions 106A may be spaced a circumferential distance from each other and the second protrusions 106B may be positioned therebetween. The third protrusion 106C may be positioned circumferentially between the first protrusion 106A and the second protrusion 106B. The first protrusion 106A may extend substantially between the outer edge 110 and the opening 108. The second protrusion 106B may begin at the outer edge 110 and extend radially, a distance in the direction of the opening 108, the length of the second protrusion 106B being less than the length of the first protrusion 106A. The third protrusion 106C may begin at the outer edge 110 and extend a distance in the direction of the opening 108, the length of the third protrusion 106C being less than the length of the second protrusion 106B and first protrusion 106A. The plurality of protrusions 106 are configured to direct air from the outer edge 110 of the heatsink 102 in the direction of the opening 108. Having the leading edges of the protrusions proximate the outer edge 110, air is able to be better directed inwardly from the periphery of the heatsink 102.

The heatsink body 104 defines a first surface 118 where the plurality of protrusions 106 extend outwardly from. Each of the plurality of protrusions 106 define a first sidewall 120 (e.g., left sidewall) and a second sidewall 122 (e.g., right sidewall) that is opposite from the first sidewall 120. Thus, adjacent protrusions 106 define a channel 124 that includes the first surface 118 of the heatsink body 104, and the first sidewall 120 of one adjacent protrusion 106 and the second sidewall 122 of the other adjacent protrusion 106. For example, the two adjacent protrusions 106 may include the first protrusion 106A and the third protrusion 106C, the second protrusion 106B and the third protrusion 106C, the first protrusion 106A and the second protrusion 106B, and/or a pair of first protrusions 106A. Air may flow through the channel 124 of one or more pairs of protrusions 106. Air may flow through a plurality of channels 124 of a plurality of pairs of protrusions 106. The fan 26 is positioned relative to the heatsink 102 such that the fan shroud 40 of the fan 26 is in close proximity to the plurality of protrusions 106 of the heatsink 102.

The fan shroud 40 may be positioned so as to at least partially close the opening of the plurality of channels 124 of the heatsink 102 (FIG. 7). For example, the plurality of channels 124 may be defined by four surfaces, the four surfaces may include the first and second sidewalls 120, 122 of adjacent protrusions 106, the first surface 118 of the heatsink body 104, and the fan shroud 40, which is positioned opposite from the first surface 118, in the longitudinal direction of axis $A_1$ and in the direction of the plurality of protrusions 106. In some instances, the fan shroud 40 may be positioned at a spaced distance away the protrusions to leave a gap between the fan 26 and the heatsink 102. However, in other embodiments, the fan 26 may be in contact with one or more protrusions of the heatsink 102.

The heatsink 102 includes one or more shroud engagement features 112 that are spaced circumferentially around the heatsink body 104 and configured to engage with the shroud 24, for example, with the one or more features 45 (FIGS. 4A and 4B). The heatsink 102 includes one or more cover engagement features 114 that are spaced circumferentially around the heatsink body 104 and configured to engage with the cover 30. The heatsink 102 defines a shaft opening 116 that has a center that is longitudinally aligned with the center of the opening 108 along the axis A1. The shaft opening 116 is sized and shaped to engage with the shaft 28. The third compartment 34 of the heatsink 102 may contain a plurality of electric drive components 48 (FIGS. 2 and 8).

In operation and referring to, for example, FIGS. 2 and 7, air from outside the motor assembly 10 is drawn into the heatsink 102 through the plurality of channels 124 positioned between adjacent protrusions 106. The airflow, designated by arrow B, travels through the channels 124 in the radial direction towards the axis $A_1$. The airflow is at least partially contained within the channels 124. The airflow travels through inner opening 44 of the fan 26 and into the second compartment 32 of the shroud 24. Depending on the desired airflow parameters of the motor assembly 10, the diameter of the inner opening 44 may be modified. For example, a larger inner opening 44 may provide increased airflow while less of the heatsink 102 is exposed to the airflow and, conversely, a smaller inner opening 44 may provide reduced airflow while more of the heatsink 102 is exposed to the airflow. The airflow is directed around the axis $A_1$ by the fins 38 of the fan 26 and contained at least partially within the second compartment 32 of the shroud 24. As indicated by arrow B, the airflow travels from the second compartment 32 of the shroud 24 through the openings 36 and along the exterior of the housing 12.

FIGS. 8-10B illustrate a different embodiment of the shroud 24, as shown and described with respect to FIGS. 2-4B, of the motor assembly 10, as shown and described with respect to FIGS. 1-3. Shroud 202 includes features/components previously described with regard to shroud 24. Thus, like parts/features will be numbered the same throughout the various embodiments. The features described with respect to one embodiment may apply to the other embodiments unless expressly stated otherwise.

Referring to FIGS. 8-10B, the motor assembly 10 includes the housing 12 coupled to the mounting bracket 14. The housing 12 and the mounting bracket 14 combine to define the first compartment 16. The first compartment 16 is sized and shaped to receive at least a portion of the motor 18. A shroud 202 is positioned in proximity to the motor 18 and coupled to the housing 12. The shroud 202 is attached to at least one of the housing 12 and/or the mounting bracket 14. For example, the shroud 202 is attached to the mounting bracket 14 by way of fasteners 43 through fastener openings 47 of the shroud 202. However, it should be understood that alternative forms of attachment may be used without departing from the spirit/scope of this disclosure. At least the shroud 202 defines a cavity. The shroud cavity is referred to as the second compartment 32. The shroud 202 is discussed in more detail with reference to FIGS. 9-10B.

The fan 26 is positioned at least partially within the second compartment 32 of the shroud 202 (FIG. 8). The fan is rotatably coupled to the motor 18. The shaft 28 of the motor 18 extends axially through axially aligned openings in the mounting bracket 14, the rotor 20, the stator 22, and is coupled to at least the fan 26 at shaft opening 46. The openings are aligned along axis $A_1$. The motor assembly 10 defines axis $A_1$ that extends the entirety of the assembly 10 through the aligned openings in the mounting bracket 14, the rotor 20, the stator 22, and the fan 26. The shaft 28 is aligned with the axis $A_1$. The fan 26 is configured to rotate about axis $A_1$ in its position between the shroud 202 and the heatsink 102. The fan 26 is configured to generate a cooling airflow that is channeled by the shroud 202 into the first compartment 16 of the housing 12.

The heatsink 102 is coupled to the shroud 202 and the cover 30, the cover 30 being positioned at an end of the motor assembly 10 that is opposite from the mounting bracket 14. The heatsink 102 may be removably coupled to the shroud 202 and/or the cover 30. At least the heatsink 102 defines the third compartment 34. The mounting bracket 14, the motor 18, the shroud 202, the fan 26, the heatsink 102 and the cover 30 are aligned along axis $A_1$.

Referring further to FIGS. 9-10B, the shroud 202 includes a body 204 that defines an outer sidewall 206 and an inner sidewall 208. The inner sidewall 208 is spaced from the outer sidewall 206 by a distance radially inwardly in the direction of the axis $A_1$. The body 204 includes a plurality of openings 36 that are circumferentially spaced around the shroud 202 relative to the axis $A_1$. The plurality of openings 36 may be circumferentially spaced around the entirety of the shroud 202. In other instances, the plurality of openings 36 may be circumferentially spaced around a portion of the shroud 202. The plurality of openings 36 are evenly spaced around at least a portion of the periphery of the shroud 24. The plurality of openings 36 may be configured to channel the air from at least within the second compartment 32 to outside the shroud 202 and along the exterior of the housing 12. In other instances, the openings 36 may define a variety of shapes, for example, a circle, triangle, quadrilateral, trapezoid, oval, and combinations thereof.

The shroud 202 defines a plurality of passages 210 that are circumferentially spaced around the shroud 202 relative to the axis $A_1$. The plurality of passages 210 are in fluid communication with at least the second compartment 32 and the first compartment 16. The plurality of passages 210 may define a base passage 216 and/or a sidewall passage 218 (FIG. 9). The base passage 216 and the sidewall passage 218 may be collectively referred to as reference number 210 and distinguishing between the base passage 216 and the sidewall passage 218 enables a more thorough explanation of the shroud 202. It does not, however, inherently indicate differences between the two passages 216, 218, unless otherwise expressly stated. In some instances, the passage 210 includes the base passage 216, the sidewall passage 218, and/or the base passage 216 and the sidewall passage 218. In some instances, the base passage 216 and the sidewall passage 218 are combined into passage 210 and in other cases, the base passage 216 and the sidewall passage 218 are separate from each other.

The plurality of passages 210 are radially spaced around the axis $A_1$ along base 214. For example, the plurality of base passages 216 may be circumferentially spaced around the axis A1 on base 214. The base 214 separates the second compartment 32 from the first compartment 16 when the shroud 202 is coupled with the housing 12 (FIG. 8). The plurality of base passages 216 may have a variety of shapes, such as in a non-limiting example, a circle, a quadrilateral, a triangle, and combinations thereof. The base 214 is in proximity to the inner sidewall 208 of the body 204. The plurality of passages 210 are radially spaced around the inner sidewall 208 of the shroud 202. For example, the plurality of sidewall passages 218 may be radially spaced around the inner sidewall 208 of the shroud 202. The plurality of sidewall passages 218 are in fluid communication with the openings 36. Thus, the plurality of passages 218 may be in fluid communication with the second compartment 32 through the plurality of openings 36 and the base 214.

In some instances, the plurality of openings 36 may be partially or entirely blocked so as to reduce (or eliminate) airflow therethrough. A ring 212 may be positioned in proximity to the plurality of openings 36 so as to reduce (or eliminate) airflow through the openings 36. The ring 212 may be sized and shaped to cover at least a portion of the plurality of openings 36. The distance the ring 212 is positioned from the body 205 in relation to the plurality of openings 36 may dictate the amount of airflow that passes through the openings 36. For example, the ring 212 may be attached directly to the body 205 in relation to the plurality of openings 36 so as to significantly reduce (or eliminate) airflow from exiting the opening 36 (FIG. 8). Airflow entering the plurality of openings 36 from the second compartment 32 may be directed through the plurality of passages 210, by way of the plurality of sidewall passages 218. Thus, the airflow that is restricted from exiting the plurality of openings 36 by the ring 212 may be directed into the first compartment 16 of the housing 12. However, airflow may be restricted from entering the plurality of openings 36 and may enter through the plurality of passages 210, by way of the base passages 216.

In operation and referring to, for example, FIG. 8, air from outside the motor assembly 10 is drawn into the heatsink 102 through the plurality of channels 124 positioned between adjacent protrusions 106. The airflow, designated as arrow B, travels through the channels 124 in the direction towards the axis $A_1$. The airflow is at least partially contained within the channels 124. The airflow travels through inner opening 44 of the fan 26 and into the second compartment 32 of the shroud 202. Depending on the desired airflow parameters of the motor assembly 10, the diameter of the inner opening 44 may be modified. For example, a larger inner opening 44 may provide increased airflow while less of the heatsink 102 is exposed to the airflow and, conversely, a smaller inner opening 44 may provide reduced airflow while more of the heatsink 102 is exposed to the airflow. The airflow is directed around the axis $A_1$ by the fins 38 of the fan 26 and contained at least partially within the second compartment 32 of the shroud 202. As indicated by arrow B, the airflow travels from the second compartment 32 of the shroud 202 and into the openings 36. Since the openings 36 are restricted by the ring 212, the airflow is directed through the plurality of passages 210, such as by way of the sidewall passages 218, into the first compartment 16 of the housing 12. The airflow exiting the second compartment 32 may also travel through the plurality of base passages 216 into the first compartment 16. The airflow entering the first compartment 16 may help cool the motor 18. In some instances, the airflow may be directed along the exterior of the housing 12 through the plurality of openings 36 and into the first compartment 16 of the housing 12 through the plurality of passages 210.

One of the many benefits of the described motor assembly 10 including the fan 26 and the heatsink 102 is the elimination of a cover traditionally positioned between the fan 26 and the heatsink 102. The cover aids in directing the airflow towards the fan 26. Here, the heatsink 102 and the fan 26 are configured to collectively direct the airflow into the fan 26. Specifically, the fan shroud 40 of the fan 26 is positioned in proximity to the channels 124 defined by the protrusions 106 of the heatsink 102 to define a semi-enclosed channel 124. The airflow travels from outside the heatsink 102 through the plurality of channels 124 and is introduced into the fan 26 through the inner opening 44. The fan 26 circulates the airflow and, with the assistance of the shroud 24, 202, directs the airflow along the exterior of the housing 12 and/or into the first compartment 16.

This written description uses examples to disclose the embodiment, including the best mode, and also to enable any person skilled in the art to practice the invention, including making and using any devices or systems and performing any incorporated methods. The patentable scope of the embodiment is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motor assembly comprising:

a mounting bracket and a housing, the mounting bracket coupled to the housing, the housing defining a first compartment;

a motor positioned within the first compartment;

a shroud coupled to the housing, the shroud includes a body, which includes a base, a first sidewall extending around a periphery of the base, and a second sidewall extending around the periphery of the base, the base and the first sidewall define a second compartment, wherein the shroud defines a plurality of circumferentially spaced passages, the plurality of circumferentially spaced passages are in fluid communication with the second compartment;

a shaft coupled to the motor and configured to rotate about an axis, the shaft extends axially through an opening in the shroud into the second compartment, the plurality of passages circumferentially spaced around the axis and between the first sidewall and the second sidewall;

a heatsink coupled to the shroud relative to the second compartment, and a cover coupled to the heatsink, the heatsink configured to introduce airflow into the second compartment; and a fan coupled to the shaft and positioned between the second compartment of the shroud and the heatsink, the fan configured to draw airflow from the heatsink.

2. The motor assembly of claim 1, wherein the fan comprises a fan shroud positioned relative to the heatsink and a plurality of fins that extend outwardly from the fan shroud in the direction of the shroud, the plurality of fins being circumferentially positioned around the axis.

3. The motor assembly of claim 2, wherein the fan shroud defines an opening that enables fluid communication between the heatsink and the second compartment of the shroud.

4. The motor assembly of claim 1, wherein the base defines the plurality of passages and the plurality of passages are in fluid communication with the second compartment and the first compartment of the housing.

5. The motor assembly of claim 4, wherein the plurality of passages are circumferentially spaced around the axis and in proximity to the first sidewall.

6. The motor assembly of claim 1, wherein the second sidewall is spaced a distance from the first sidewall in a direction away from the axis.

7. The motor assembly of claim 1, wherein the plurality of passages includes a first set of passages and a second set of passages, wherein the first set of passages are circumferentially spaced around the axis and in proximity to the first sidewall, and wherein the second set of passages are circumferentially spaced around the axis between the first sidewall and the second sidewall that is spaced a distance from the first sidewall around the periphery of the base and in a direction away from the axis.

8. The motor assembly of claim 7, further comprising a ring positioned with respect to the second set of passages and configured to prevent airflow therefrom and direct airflow into the first compartment.

9. The motor assembly of claim 1, wherein the fan comprises a fan shroud positioned relative to the heatsink, the fan shroud defines an opening concentric with the shaft;

wherein a plurality of protrusions extend outwardly from a heatsink body in the direction of the fan shroud, wherein each of the plurality of protrusions defines a first sidewall and a second opposing sidewall, a pair of adjacent protrusions of the plurality of protrusions defines a channel that includes the first sidewall of a first adjacent protrusion, the second sidewall of a second adjacent protrusion, the heatsink body, and the fan shroud of the fan, wherein a plurality of channels are spaced radially around the axis relative to the pairs of adjacent protrusions; and wherein the plurality of channels are configured to direct airflow towards the axis and through the opening in the fan shroud.

10. The motor assembly of claim 1, wherein the plurality of passages are configured to direct the airflow into the first compartment of the housing.

11. The motor assembly of claim 1, wherein the plurality of passages are configured to direct the airflow along an exterior of the housing.

12. A motor assembly comprising:

a mounting bracket and a housing, the mounting bracket coupled to the housing, the housing defining a first compartment, and a motor positioned within the first compartment;

a shroud coupled to the housing, the shroud includes a body, which includes a base, a first sidewall extending around a periphery of the base, and a second sidewall that is spaced a distance from the first sidewall around the periphery of the base and in a direction away from the base; the base and the first sidewall define a second compartment, wherein the base and the first sidewall define a first set of circumferentially spaced passages, and the first sidewall and the second sidewall define a second set of circumferentially spaced passages, wherein the first set of passages are in fluid communication with the second compartment and the second set of passages;

a shaft coupled to the motor and configured to rotate about an axis, the shaft extends axially through an opening in the shroud into the second compartment;

a heatsink coupled to the shroud relative to the second compartment, and a cover coupled to the heatsink, the heatsink configured to introduce airflow into the second compartment; and a fan coupled to the shaft and positioned between the second compartment of the shroud and the heatsink, the fan configured to draw airflow from the heatsink.

13. The motor assembly of claim 12 further comprising a ring positioned with respect to the second set of passages so as to prevent airflow therefrom.

14. The motor assembly of claim 12, wherein the first set of passages are in fluid communication with the second compartment and the first compartment of the housing.

15. The motor assembly of claim 13, wherein the airflow is directed through the second set of passages, through the first set of passages, into the first compartment.

16. The motor assembly of claim 12, wherein each of the second set of passages defines a cross-sectional shape including a first edge positioned in proximity to the second sidewall of the shroud and a second opposing edge positioned in proximity to the first sidewall of the shroud, a pair of angled features extending between the first and second edges, wherein the pair of angled features flare outwardly relative to each other.

17. A method of operating a motor assembly, wherein the motor assembly includes a mounting bracket coupled to a housing, the housing defining a first compartment, and a motor positioned within the first compartment; a shroud coupled to the housing, the shroud includes a body, which includes a base and a first sidewall extending around a periphery of the base, the base and the first sidewall define a second compartment, wherein the shroud defines a plurality of circumferentially spaced passages, the plurality of circumferentially spaced passages in fluid communication with the second compartment; a shaft coupled to the motor and configured to rotate about an axis, the shaft extends axially through an opening in the shroud into the second compartment; a heatsink coupled to the shroud relative to the second compartment, and a cover coupled to the heatsink, the heatsink is configured to introduce airflow into the second compartment; and a fan coupled to the shaft and positioned between the second compartment of the shroud and the heatsink, the fan configured to draw airflow from the heatsink, the method comprising:

drawing airflow from outside the motor assembly through the heatsink;

introducing the airflow into the second compartment of the shroud through an opening in the fan;

circulating the airflow within the second compartment of the shroud; and directing the airflow through the plurality of passages and in the direction of the housing.

18. The method of claim 17, wherein the plurality of passages includes a first set of passages and a second set of passages, wherein the first set of passages are circumferentially spaced around the axis and in proximity to the first sidewall, and wherein the second set of passages are circumferentially spaced around the axis between the first sidewall and a second sidewall that is spaced a distance from the first sidewall around the periphery of the base and in a direction away from the axis, the shroud further comprises a second sidewall that is spaced a distance from the first sidewall around the periphery of the base and in a direction away from the base, the first sidewall and the second sidewall define a plurality of circumferentially spaced openings, wherein directing the airflow through the plurality of passages and in the direction of the housing further comprises one of directing the airflow through the first set of passages into the first compartment, directing the airflow through the second set of passages along an exterior of the housing, or directing the airflow through the first set of passages into the first compartment and directing the airflow through the second set of passages along an exterior of the housing.

19. The method of claim 17, wherein directing the airflow through the plurality of passages and in the direction of the housing further comprises directing the airflow through the plurality of passages and into the first compartment.

20. The method of claim 17, wherein directing the airflow through the plurality of passages and in the direction of the housing further comprises directing the airflow through the plurality of passages and along an exterior of the housing.

* * * * *